May 19, 1964   F. W. NEWBURGH   3,133,552
SPEED RESPONSIVE FUEL CONTROLLER
Filed Feb. 23, 1962   3 Sheets-Sheet 1
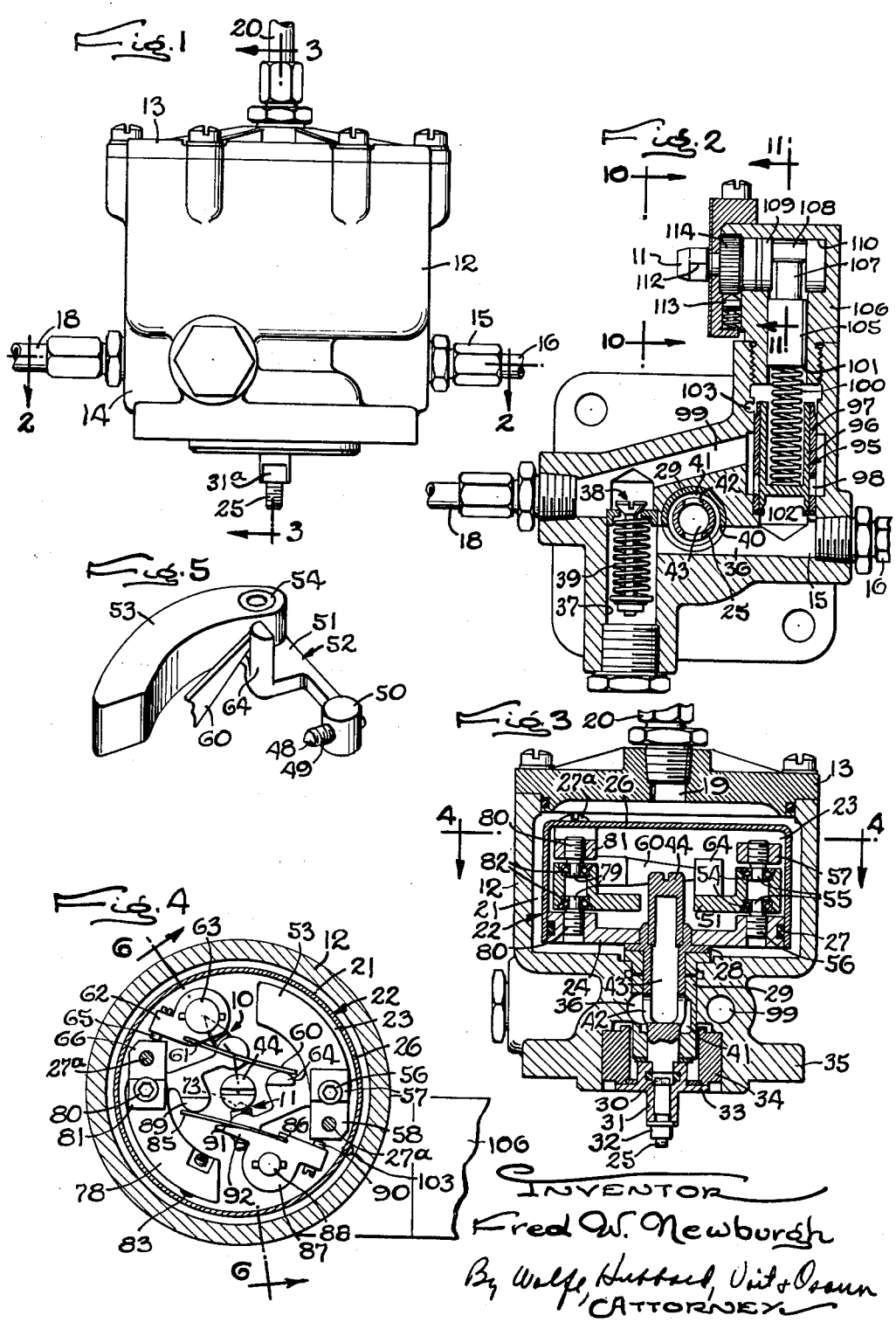

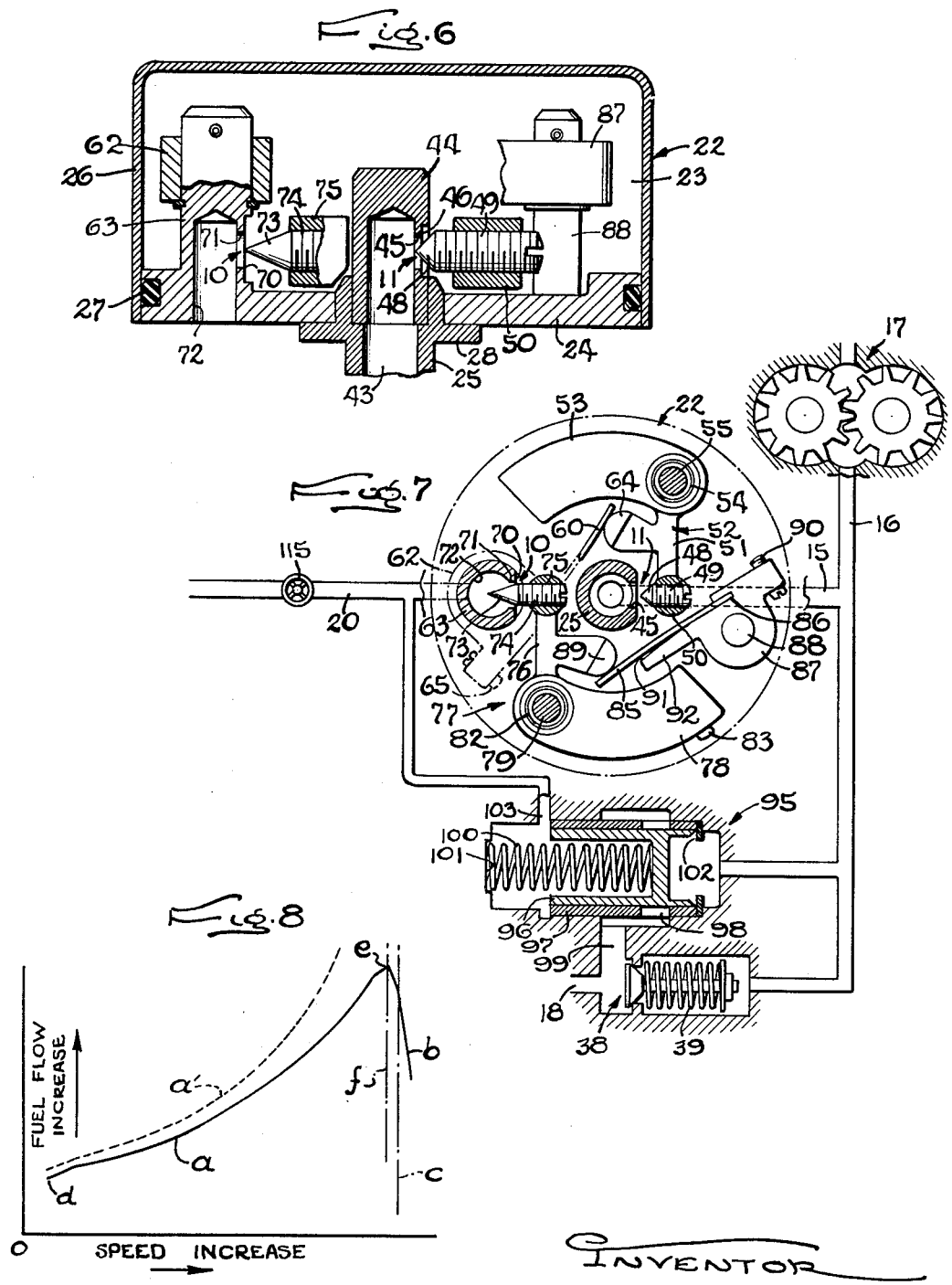

May 19, 1964   F. W. NEWBURGH   3,133,552
SPEED RESPONSIVE FUEL CONTROLLER
Filed Feb. 23, 1962   3 Sheets-Sheet 3
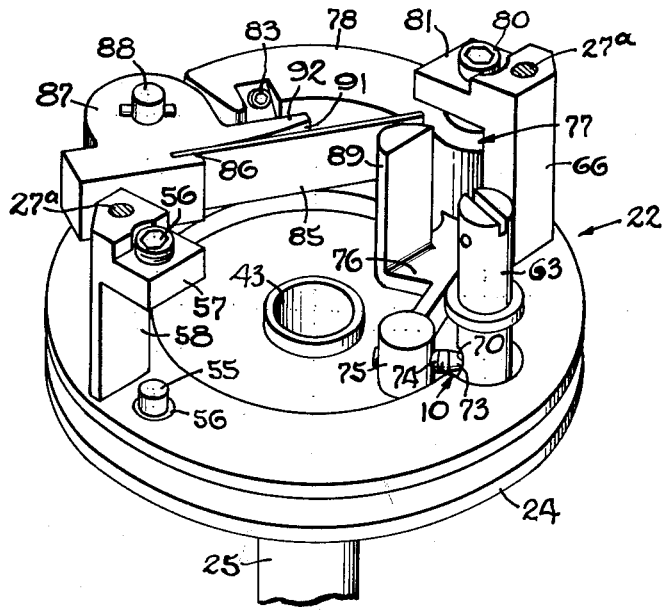
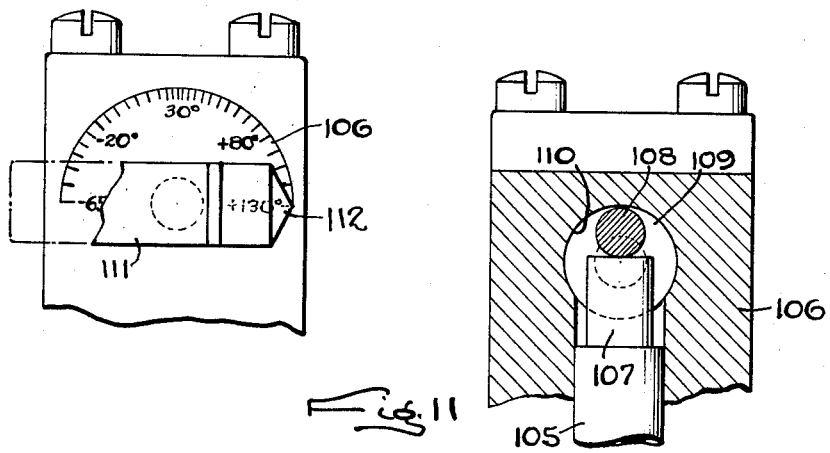
INVENTOR
Fred W. Newburgh
By Wolf, Hubbard, Voit & Osann
ATTORNEYS United States Patent Office 3,133,552
Patented May 19, 1964

3,133,552
SPEED RESPONSIVE FUEL CONTROLLER
Fred W. Newburgh, Rockford, Ill., assignor to Woodward Governor Company, Rockford, Ill., a corporation of Illinois
Filed Feb. 23, 1962, Ser. No. 175,075
17 Claims. (Cl. 137—50)

This invention relates to a governor for metering fuel to the burner of a prime mover such as a gas turbine and in certain aspects is especially concerned with the scheduling of the fuel flow during acceleration of the prime mover.

The general object is to provide a speed governer of the above character which, as compared to prior governors for the same purposes, is much simpler and smaller in construction, lower in cost, and more reliable and durable in service use.

A second object is to schedule the fuel flow during acceleration by means built into the governor itself and without external connections to bellows, thermostatic bulbs or the like.

A third object is to utilize an auxiliary speed sensor in a novel manner to limit the fuel flow during acceleration.

A fourth object is to provide a hydraulic speed governor in which the flyweight, the speeder spring, and all of the parts of the valve actuated by a flyweight are mounted on the same rotating head.

A fifth object is to provide a flyweight actuated control valve which is of the needle type and free of rubbing friction.

A sixth object is to control the fuel flow during acceleration and operation by separate speed responsive valves connected in series and each subjected to a constant metering head maintained by a single automatic by-pass valve.

A seventh object is to utilize an auxiliary speed sensor in a novel way to schedule the fuel flow during acceleration and to provide different selected schedules.

An eighth object is to adapt the control in a novel manner for operation at different ambient air temperatures.

The invention also resides in the novel construction and mounting of the flyweights and valves to provide extreme over-all compactness of the control and balance of the rotary ball head.

Other objects and advantages of the invention will become apparent from the following detailed description taken in connection with the accompanying drawings, in which FIGURE 1 is a side elevation of a gas turbine controller embodying the novel features of the present invention.

FIGS. 2 and 3 are sections taken respectively along the lines 2—2 and 3—3 of FIG. 1.

FIG. 4 is a section taken along the line 4—4 of FIG. 3.

FIG. 5 is a perspective view of one of the flyweights.

FIG. 6 is a fragmentary sectional view taken along the line 6—6 of FIG. 4.

FIG. 7 is a schematic view.

FIG. 8 shows the operating curves of the controller.

FIG. 9 is a fragmentary perspective view of the ball head with certain parts omitted therefrom.

FIG. 10 is a fragmentary elevation view taken along the lines 10—10 of FIG. 2.

FIG. 11 is a fragmentary section taken along the line 11—11 of FIG. 2.

In the drawings, the invention is shown for purposes of illustration incorporated in a governor for metering the flow of liquid fuel to a gas turbine so as to limit the fuel flow during acceleration according to a preselected schedule indicated at $a$ in FIG. 8 and then vary the flow to maintain a substantially constant speed of the turbine during normal or steady-state operation indicated at $b$. Generally stated and as applied to the control of a gas turbine, the invention contemplates metering the fuel flow according to the combined positions of a speed responsive valve 10 during acceleration and by a second speed responsive valve 11 during steady-state operation. The two valves, which operate in different speed ranges, are arranged in series relation in the fuel line, and accurate metering of the fuel in accordance with the valve positions is achieved by maintaining a constant pressure drop across each valve while it is in active control of the fuel flow.

All of the operating parts for performing these functions are enclosed within a generally cylindrical fluid-tight housing 12 including a detachable cover 13 and a base 14 having an inlet 15 for receiving fuel delivered by an external pump 17 at relatively high pressure and through a pipe 16. Also, in the base, is a low pressure outlet pipe 18 through which excess fuel is by-passed for a purpose to be described later. In this instance, the metered fuel flows through an outlet 19 and a pipe 20 (FIGS. 1 and 3) leading to the prime mover being controlled, this outlet being in the cover 13 and communicating with a first fluid-tight chamber 21 defined by the housing 12 and its cover.

In accordance with one aspect of the invention, all of the parts of the two valves 10 and 11 and their speed responsive actuators are mounted on a ball head 22 disposed in the chamber 21 and journaled in the base 14 of the housing, the ball head itself defining a second fluid-tight chamber 23 for the flow of fuel between the series connected valves. Herein, the ball head includes a generally circular disk 24 fast on the upper end of a drive shaft 25 (FIGS. 3 and 6) and telescoped securely into the lip of an inverted cylindrical cup 26 concentric with the shaft axis and sealed within the latter by a ring 27. The cup is fixed to the ball head by screws 27a (FIG. 3) threading into holes in the upper ends of posts upstanding from the ball head. The upper end of the drive shaft is pressed through the center of the disk to bring a flange 28 thereon into abutment with the bottom of the disk. The flange is supported on the flanged upper end of a bushing 29 sealed into a central bore of the base and providing a bearing in which the shaft is journaled. Below the bushing, a flattened part 30 of the shaft is coupled to and sealed in a sleeve 31 clamped to the shaft by a nut 32 with a flange 33 thereon held in sealing contact with a carbon ring 34. The sleeve projects below a mounting flange 35 at the bottom of the base 14 and is flattened as indicated at 31a (FIG. 1) for coupling to a suitable drive shaft.

A passage 36 (FIG. 2) within the base extends from the inlet 15 to a transverse bore 37 containing a pressure relief valve 38 normally closed by a spring 39 and acting, when opened by an excessive supply pressure, to open and by-pass fuel to the outlet 18. One side of the bushing 29 is cut away as indicated at 40 and communicates with the high pressure passage 36 and a groove 41 extending around the interior of the bushing and communicating through holes 42 with a passage 43 leading upwardly through the shaft and a tubular extension 44 thereof upstanding from the center of the ball head. Short of the upper closed end of this tube is a hole 45 opening laterally into the chamber 23 and defined by the annular seat 46 of the valve 11 mentioned above.

In the present instance, the valve 11 is of the needle type having a movable member which comprises the coned end surface 48 of a screw 49 threaded through the enlarged end 50 on one arm of an L-shaped bell-crank 52 (FIG. 5) whose other arm 53 constitutes a flyweight. Anti-friction bearings 54 are pressed into opposite ends of a hole at the heel of the bell-crank and journaled on pins 55 formed by the ends of screws 56 (FIGS. 3 and 9). One of these is threaded through the ball head and the other through a lug 57 projecting laterally from the upper end of a post 58 upstanding from the ball head and located near the outer edge of the ball head so as to dispose the flyweight, which is arcuate in shape, adjacent the inner wall of the cup 26 and generally concentric with the governor axis.

The centrifugal force urging the flyweight outwardly during turning of the ball head is opposed by a speeder spring 60 which herein comprises a substantially straight, and in this instance, tapered leaf of resilient metal having its wide end 61 telescoped onto the shouldered upper end of a post 63 (FIGS. 6 and 9) upstanding from the ball head. At its free and pointed end, the cantilever spring bears against the curved surface of a lug 64 upstanding from the arm 51 near the pivot of the bell-crank thus urging the flyweight inwardly. The force exerted by the spring is determined by the adjustment of a set screw 65 threaded through a lug on the ring 62 and bearing against a post 66 rigid with and upstanding from the ball head 22 near the periphery and on the side thereof opposite the post 58. Tapering of the leaf 60 as shown in FIG. 3 provides a low spring scale and a substantially constant changing of the stress over the full speed range of the steady-state governor. The desired drooping characteristic of the latter is thus achieved.

The valve screw 49 and the screw 65 are adjusted and the spring 60 is scaled to maintain the valve 11 fully open during starting and acceleration of the controlled turbine all the way up to the desired full speed $c$ (FIG. 8). That is to say, the screw 49 is backed so far away from the seat 46 as shown in FIG. 7 when the control is idle that during the inward movement of the screw which accompanies acceleration of the turbine, the valve 11 does not start to throttle the fuel flow until the desired operating speed $c$ is exceeded.

The acceleration control valve 10 is also of the needle type and of essentially the same construction as the valve 11. It includes a seat 70 (FIGS. 6 and 7) on the post 63 above described defining a laterally opening hole 71 communicating with a passage 72 which is formed in the lower part of the posts and extends downwardly through the ball head disk 24 so as to communicate continuously with the outer chamber 23. Cooperating with the seat 70 is the tapered end 73 of a horizontally disposed screw 74 threaded through a head 75 on the outer end of an arm 76 of a bell-crank 77 of the same construction as the bell-crank 52 above described and having a second arcuate arm 78 constituting the second flyweight. To dispose the latter on the side of the ball head opposite the weight 53, tubular pins 79 (FIG. 3) extend into the heel of the bell-crank and are supported by screws 80 threading through the ball head and a lug 81 projecting laterally from the upper end of the post 66. The pivot pins are journaled in bearings 82 in the heel of the bell-crank which is thus supported for radial inward and outward swinging of the flyweight to respectively decrease and increase the opening of the valve 10. The extent of opening of the valve and therefore the maximum permissible fuel flow may be varied by adjusting a screw 83 threaded through a radially extending hole near the free end of the flyweight and adapted to engage the cup 26 when a predetermined speed has been attained.

As before, the centrifugal force exerted on the flyweight is balanced against the force of a leaf spring 85 anchored at 86 in a block 87 journaled on the upper end of a shouldered post 88 (FIGS. 4 and 6) upstanding from the ball head. The free end of the spring bears against a lug 89 on the bell-crank arm 76, the spring force being determined by the adjustment of a set screw 90 threading through an outwardly projecting lug on the block 87 and bearing against the side of the post 58. The adjustment is such that with the parts at rest as shown in FIG. 7, the screw point 73 projects through the hole 74 substantially to but slightly short of the seat 70. Thus the valve is partially opened as indicated at $d$ (FIG. 8). During acceleration of the turbine, the valve point 73 will be retracted progressively out of the hole 71, thus increasing the fuel flow along the curve $a$ up to the maximum limit $e$ at a speed $f$ close to the desired operating speed $c$.

In the present instance, the shape of the acceleration curve $a$ is determined not only by the scale of the spring 85 but also by a cam 91 which operates automatically as an incident to swinging of the flyweight to vary the effective length of the spring. Herein, the cam surface is on a lug 92 rigid with the block 87 and projecting along the spring leaf with the surface 91 diverging gradually away from the leaf beginning at the anchor 86 when the parts are in the rest positions shown in FIG. 7. Thus, as the flyweight 78 swings outwardly with an increase in speed, the accompanying outward movement of the free end of the spring bends the latter toward the cam surface and the point of anchorage of the spring shifts away from the anchor 86. The effective length of the spring is thus shortened progressively with the result that the slope of the curve $a$ is increased correspondingly over the upper or high speed portion of the acceleration range.

When the turbine attains the speed $f$, the fuel being delivered exceeds that required for maintaining the desired operating speed $c$. Accordingly, the main speed governor takes control and changes the same back and forth along the speed droop curve $b$ which includes the desired speed $c$. This speed determined by the setting of the speeder spring 60 varies along a narrow range determined by the amount of droop, usually about two percent, that is required in order to achieve the desired stability and avoid hunting.

To meter the fuel accuracy in accordance with the positions of the valve members 49 and 74 and therefore with speed both during acceleration and steady-state operation, provision is made for maintaining a constant pressure drop across the respective valves 10 and 11 when they are in active control of the flow. Advantage is taken of the fact that these valves are in control at different times so that the maintenance of a constant drop across each valve when it is in control may be determined by a single differential relief valve 95 which is located within the base 14 so that it may serve both of the rotating valves 10 and 11. Referring to FIGS. 2 and 7, the valve comprises a hollow plunger 96 slidable in a bushing 97 opening at one end into the high pressure inlet passage 15 and having a port 98 opening laterally into a passage 99 leading to the by-pass outlet 18. A spring 100 acting in compression between the closed end of the plunger and an adjustable abutment 101 urges the plunger toward a limit position (FIG. 7) against an abutment 102, the valve port 98 then being closed.

The opposite side of the plunger 96 is subjected to the pressure of the metered fuel within the outer housing chamber 21, the latter communicating with the interior of the plunger through a hole 103 (FIG. 4) in the bottom wall of the chamber. The plunger moves back and forth with changes in the difference between the pump discharge and metered fuel pressures, the port 98 being uncovered when the differential exceeds a value determined by the force of the spring. The excess fuel is thus by-passed to and escapes from the outlet 18.

To adapt the controlled turbine for operation at widely varying ambient temperatures, means is provided for moving the abutment 101 to different positions to thereby change the force of the spring 100 and therefore the pressure drop maintained across the valves 10 and 11. For this purpose, the abutment comprises the inner end of a pin 105 slidable in a bore in a cap 106 threaded into a hole in the housing base 14 in alinement with the plunger 96. The outer end 107 of the pin constitutes the follower of an eccentric cam 108 on a shaft 109 journaled and sealed in bearings 110 in the cap and having an outwardly projecting end to which a handle 111 is fixed. A pointer 112 on the handle cooperates with a scale 116 on the outer face of the cap 106 to facilitate gaging of the spring adjustment which is retained by a spring loaded detent 113 engaging a serrated portion 114 of the shaft 109. To adapt the control for operation at lower ambient temperatures, the handle is turned in a direction to increase the spring force, the pressure drop across the valves and the fuel flow to the turbine. Such an adjustment produces the same percentage increase in flow all along the acceleration curve as indicated at $a'$.

*Operation*

Gas turbines are usually provided with a fuel shut-off valve 115 in the metered fuel line 20. To start the turbine, this valve is opened and the turbine is cranked to start the pump and initiate delivery of fuel through the valves 10 and 11 and to the burners for ignition. The ports of the controller are then positioned as shown in FIG. 7, the main governor valve 11 being fully opened and the limit valve 10 nearly closed so as to deliver fuel initially at a rate $d$ (FIG. 8). As the turbine speed increases, the valve 10 opens progressively increasing the fuel flow in accordance with the schedule $a$ determined by the adjustment of the speed spring 85, the cam 91, and the setting of the differential relief valve 95 to suit the prevailing ambient temperature. The maximum flow is attained at the point $e$ at which the flow is greater than that required to maintain the desired speed $c$. As a result, the speed continues to increase and the main governor valve 11 takes control, this being accompanied by the automatic transfer of the maintained pressure drop to this value since the valve 10 is then conditioned for a greater flow. During steady-state operation, the valve 11, its flyweight 53 and speeder spring 60 operate as an ordinary speed droop governor to vary the fuel with a narrow droop range and maintain the turbine speed in a corresponding range.

If the turbine becomes overloaded, its speed decreases but the amount of fuel admitted is limited to the amount $e$ by the action of the valve 10.

To stop the turbine, the shut-off valve 115 is closed thus interrupting the fuel flow to the burner, the excess fuel delivered by the pump escaping through the pressure relief valve 38 until the turbine comes to a stop.

I claim as my invention:

1. In a speed governor of the character described, the combination of, a housing defining a fluid-tight chamber having a metered fluid outlet and a base from a high pressure inlet and a by-pass outlet, a hollow rotary ball head within said chamber and defining a second fluid-tight chamber, a drive shaft supporting said ball head and journaled in and extending through said base, the inner end portion of said shaft defining a passage communicating at one end within said base with said inlet, the inner end of said passage terminating at a laterally opening hole defining a valve seat within said second chamber, a flyweight fulcrumed on said head within said second chamber, a needle cooperating with said seat to form a first valve and actuated by said flyweight to vary the valve opening, a second flyweight fulcrumed on said head within said second chamber, a second valve seat defining an opening in said second chamber communicating with said first chamber, and a second needle cooperating with said second seat to form a second valve and actuated by said second flyweight to vary the opening of the second valve.

2. A speed governor as defined in claim 1 in which said first and second valves control the flow of liquid serially therethrough over different speed ranges of said shaft.

3. A speed governor as defined in claim 1 including a valve automatically responsive to the pressures in said inlet and said first chamber and operable to divert fluid to said by-pass outlet and maintain a substantially constant pressure drop between said inlet and said first chamber.

4. A speed governor as defined in claim 1 in which the fulcrums of said flyweights parallel the rotational axis of said ball head.

5. A speed governor as defined in claim 1 in which said valve seats comprise annular surfaces and said valve members are conical needles alined axially therewith.

6. A speed governor as defined in claim 1 in which said second valve is opened progressively as the speed of said drive shaft increases up to a normal steady-state value and said first valve is normally open when said shaft is at rest and is opened and closed progressively during speed variations below and above said steady-state value.

7. In a speed governor of the character described, the combination of, a housing defined a fluid-tight chamber having a metered fluid outlet and having a base with a high pressure inlet and a by-pass outlet, a hollow rotary ball head within said chamber and defining a second fluid-tight chamber, a drive shaft journaled in and extending through said base and supporting said ball head within said chamber, a flyweight fulcrumed on said head, a first valve mounted on said head and having a member actuated by said flyweight to vary the valve opening, a second flyweight fulcrumed on said head, a second valve mounted on said head and having a member actuated by said second flyweight to vary the valve opening, means defining passages connecting said first and second valves in series between said high pressure inlet and said metered fluid outlet, a spring mounted on said head and opposing the centrifugal force on said first flyweight to open said first valve progressively as the speed of said shaft increases up to a predetermined desired value, and a spring mounted on said head and opposing the centrifugal force on said second flyweight to maintain said second valve open at speeds below said desired value and then open and close such valve progressively in accordance with falls in the speed below and rises above such value.

8. In a speed governor of the character described, the combination of, a housing defining a fluid-tight chamber having a metered fluid outlet and a high pressure inlet, a hollow rotary ball head within said chamber defining a second fluid-tight chamber, a drive shaft journaled in and extending through said base and supporting said ball head within said first chamber, a passage communicating at one end within said base with said inlet and at the other end with said second chamber, a second passage extending between said first and second chambers, first and second valves respectively controlling the flow of liquid through said first and second passages, means responsive to changes in the speed of said shaft including a flyweight fulcrumed on said head within said second chamber and operable to maintain one of said valves partially open at low speeds and to increase the opening of the valve up to a desired operating speed, and a similar speed responsive means for maintaining said other valve fully open at speeds below said desired speed while opening and closing said valve as the speed of said shaft respectively falls below and rises above such desired speed.

9. A speed governor as defined by claim 8 including a by-pass outlet in said base, and an automatic spring loaded valve responsive to the difference in pressures in said inlet and metered fuel outlet and operable to by-pass liquid to said by-pass outlet when such differential exceeds a predetermined value.

10. A speed governor as defined in claim 9 in which said pressure responsive valve is mounted in said base and operates to maintain a constant pressure drop across said first and second valves.

11. A speed governor as defined in claim 10 in which said pressure responsive valve includes a spring determining the amount of said drop and including means accessible from the exterior of said housing and adjustable to different selected positions to vary the stress of said spring.

12. In a speed governor of the character described, the combination of, a housing having a metered fluid outlet and a high pressure inlet, a drive shaft journaled in and extending through a wall of said housing, a first valve within said housing means including a flyweight rotatable with said shaft and operable to maintain said valve partially open when said shaft is at rest and to open the valve progressively as the speed of said shaft increases to a predetermined desired value, a second valve within said housing, means including a second flyweight rotatable with said shaft and operable to maintain the second valve substantially fully open at speeds of said shaft below said desired value and to increase and decrease the opening of the valve as the speed deviates from said value below and above the latter, means within said housing connecting said valves in series between said inlet and outlet, whereby the flow of metered fuel through said inlet is controlled by said first valve during acceleration of said shaft to said desired speed and by said second valve while the speed is near said desired value.

13. In a speed governor, the combination of, a housing having a high pressure inlet and a metered liquid outlet, a rotary shaft journaled in and projecting through a wall of said housing, a ball head fast on said shaft within said housing, said shaft having a laterally opening hole defined by a valve seat beyond said ball head, a passage within said shaft establishing communication between said hole and said inlet, a bell-crank lever having two angularly related arms, means fulcruming said lever on said ball head to swing about an axis paralleling said shaft and located at the junction of said arms, one of said arms constituting a flyweight and swingable radially about said axis in response to changes in the speed of said shaft, a needle cooperating with said valve seat to form a valve controlling the flow of liquid between said inlet and outlet, said needle being fixed to the second arm of said lever for movement into and out of said hole, and spring means acting on said lever to urge said flyweight inwardly in opposition to the centrifugal force thereon during rotation of said shaft.

14. In a speed governor, the combination of, a housing defining a fluid-tight chamber and having a high pressure inlet and a metered liquid outlet, a rotary drive shaft projecting through and journaled in a wall of said housing, a disk constituting a ball head fast on said shaft within said housing, a hollow post upstanding from said disk within said housing and having an annular laterally facing valve seat defining a hole communicating on one side with said chamber and on the other side with said inlet, a lever fulcrumed intermediate its ends to swing radially about an axis paralleling said shaft, one end of said lever constituting a fly-weight and projecting from said axis circumferentially of said disk, a needle cooperating with said seat to form a valve and mounted on the other end of said lever to move into and out of said hole during radial swinging of said flyweight with changes in the speed of said shaft, and spring means carried by said disk and urging said flyweight inwardly to balance the centrifugal force thereon.

15. A speed governor as defined in claim 14 in which said spring means comprises a resilient leaf anchored at one end on said disk to swing in a plane parallel thereto and bearing at its other end on a part of said lever spaced from said axis.

16. A speed governor as defined in claim 15 including a cam surface rigid with said disk and lying alongside said leaf spring, said surface being shaped for engagement with said leaf at points spaced progressively and outwardly away from the spring anchor whereby to shorten the effective length of said spring progressively as the speed of said shaft increases.

17. In a speed governor, the combination of, a housing defining a fluid-tight chamber and having a high pressure inlet and a metered liquid outlet, a rotary drive shaft projecting through and journaled in a wall of said housing, a disk constituting a ball head fast on said shaft within said housing, a hollow post upstanding from said disk within said housing and having an annular laterally facing valve seat defining a hole communicating on one side with said chamber and on the other side with said inlet, a bell-crank having first and second arms disposed substantially at right angles to each other, means fulcruming said bell-crank on said disk to swing about an axis paralleling said shaft and located at the junction of said arms, said first arm constituting a flyweight, a valve needle rigid with and projecting from the free end of said second arm perpendicular to the latter and axially into said hole whereby to coact with said seat to form a valve, and spring means carried by said disk and urging said flyweight inwardly to balance the centrifugal force thereon.

References Cited in the file of this patent

UNITED STATES PATENTS

| | | |
|---|---|---|
| Re. 15,650 | Moore | July 10, 1923 |
| 248,961 | Talbot | Nov. 1, 1881 |
| 260,842 | Chase | July 11, 1882 |
| 781,833 | Lloyd | Feb. 7, 1905 |
| 1,347,208 | Cockburn | July 20, 1920 |
| 1,720,652 | Hamersveld | July 9, 1929 |
| 1,912,668 | Sylvander | June 6, 1933 |
| 2,587,981 | Duffield | Mar. 4, 1952 |
| 2,598,439 | Reger | May 27, 1952 |
| 2,840,094 | Taplin | June 24, 1958 |